J. M. REEDS.
Hand Seeder.
No. 62,067.
Patented Feb. 12, 1867.
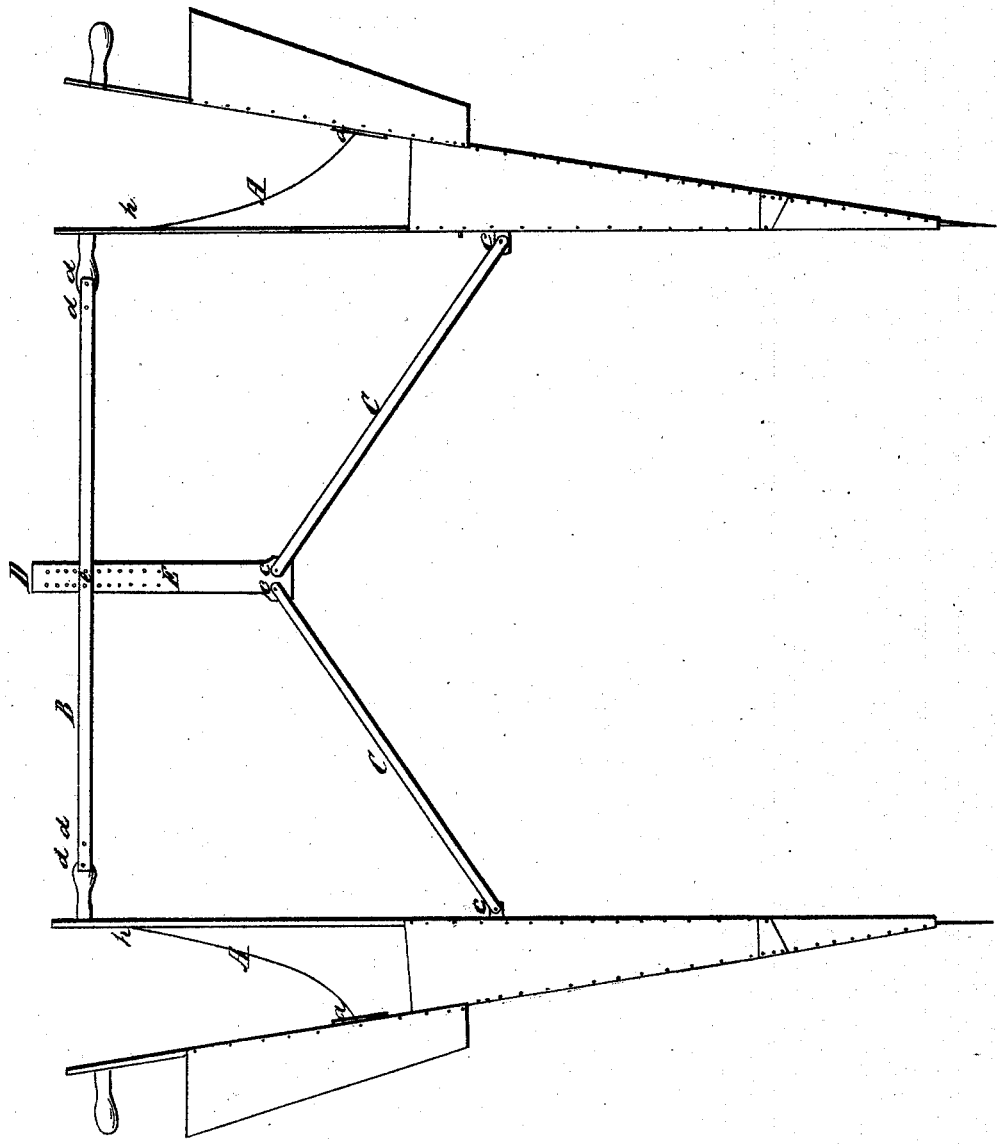

United States Patent Office.

JOHN M. REEDS, OF MILLWOOD TOWNSHIP, MISSOURI.

Letters Patent No. 62,067, dated February 12, 1867.

IMPROVEMENT IN CORN-PLANTERS.

The Schedule referred to in these Letters Patent and making part of the same.

Be it known that I, JOHN M. REEDS, of Millwood Township, Lincoln county, and State of Missouri, have invented a new and useful improvement on "Hugh's Corn Planter," this being the same that Jacob Morris received a patent for improvement; and I do hereby declare that the following is a full, clear, and exact description of the construction and operation of the same, reference being had to the annexed drawings, making a part of this specification, and being a longitudinal view of Hugh's corn-planter with its improvements, and those that I pray to be patented. Jacob Morris's improvement consists only in a scatterer. I claim a patent for a steel spring and double gearing.

Description of the Machine.

A represents the spring; $h$ its attachment; $a$, the small roller and piece of steel it rolls upon; the letters B C D, the double gearing. B C are pieces of sheet iron; D, an upright beam made of wood, with two rows of holes marked E. The attachments of the double gearing $d\,d$, $c\,c$, are bolts and screws. Either one of the planters may be easily detached by removing the bolts $d$ and $c$. The bolt $c$ on the machine is attached to the scatterer. Now the benefits arising from my improvements may be stated as follows, viz: With the original machine beginners, inexperienced and careless persons, are almost certain to insert the blades into the ground open or not sufficiently close to prevent soil from between the blades, and if the soil is the least damp they clog up. They have to be cleansed almost constantly. Now, the spring A entirely overcomes this difficulty and keeps them closed just as they should be when they enter the earth, and obviates the necessity of pulling the top of the planter to close the blades before they are inserted into the ground, and saves nearly one-half of the power required by the original machine. The benefits derived from the double gearing are that the same power required in using one of the original machines, with this, will do double as much, only requiring closing at the top instead of opening and closing to plant two rows. The width of the rows can be easily regulated by raising or lowering the beam D. One of the planters can be detached by removing the bolts $d$ and $c$ and used for planting or replanting.

What I claim as my improvement, and desire to secure by Letters Patent, is—

The steel spring marked A on the drawing, and roller and double gearing also above described, in combination with the hand corn-planter as specified.

JOHN M. REEDS.

Witnesses:
   WM. S. HUTT,
   D. T. WADDY.